3,471,612
DIPHENYLALKYLAMINES AS A HEMATOCIDE
Hilary F. Goonewardene, Moorestown, N.J., assignor to Smith Kline & French Laboratories, Philadelphia, Pa., a corporation of Pennsylvania
No Drawing. Filed Jan. 15, 1965, Ser. No. 425,938
Int. Cl. A01n 9/20, 17/00
U.S. Cl. 424—43         7 Claims

ABSTRACT OF THE DISCLOSURE

Compositions comprising 1,3-diphenyl isoalkyl amines, optionally ring substituted, having nematocidal, fungicidal and herbicidal activity, and exemplified by 1,3-diphenyl isopropyl amine. These compounds are prepared by methods published in the literature.

---

This invention relates to compositions and methods for the control of plant diseases caused by plant pathogens. In still another aspect, it relates to multifunctional uses of the compounds for control of nematodes and selective herbicidal activity.

Although compounds are known which are broadly effective against as many as two major classes of pests, typically nematodes, or fungi and bacteria, it is surprising to discover a substance that is also herbicidal against the monocotyledonous sub-class of angiospermous plants in pre-emergent stage screening and being substantially non-phytotoxic to dicotyledons. Thus selectivity of action has important economic implications.

It has been found that nematodes and soil fungi frequently act together to bring about the onset of plant diseases and subsequent breakdown of plant tissues. Parasitic nematodes puncture the epidermal layers of roots and thus provide points of entery for pathogenic fungi.

Nematodes are non-segmented worms [phylum Nemta Thorne (1961)], found in terrestrial and aquatic environments as parasites of plants and animals. The "nematode" as used herein is intended to include all phases of the life cycle of the nematode, such as eggs, larvae and adults.

Plant parasitic nematodes, or eelworms, range in length from less than one sixty-fourth of an inch and seldom exceed one-eighth of an inch. They are found in all environments in which plants will grow, and consequently all plants are subject to attack by this pest. The annual damage either directly or indirectly incurred through nematode activity may be as great as three billion dollars.

Parasitic nematodes can be broadly classified as cyst forming, endoparasitic, ectoparasitic, and above ground feeders, all of which are known to affect a number of plants.

In crop protection against these soil pathogens various agricultural practices have been employed. Crop rotations have been practiced which include at least one crop which does not serve as host to the pathogens. The breeding of resistant crop strains has occasionally met with some success, but more frequently has been a failure. In many cases infested land must be permanently abandoned insofar as its use for growing the disease-susceptible crop is concerned.

Where the value of the land is high, or where expensive crops are involved, chemical measures for crop protection have been found to be more economically desirable. However, since these same chemicals may be generally toxic to the crop plants, it is the customary practice to introduce the chemical several weeks before planting the crop, allowing time for the chemical to act on the pathogen, and subsequently dissipate. This waiting period is a disadvantage to the farmer since it introduces an undesirable delay or shortening of his growing season. However, where the fumigant is selectively herbicidal, the use of such phytotoxic fumigants may be strongly indicated, e.g. to inhibit germination of monocotyledonous grasses in favor of dicotyledonous crops like beans.

It is an object of this invention to provide a new fumigant composition. A further object is the provision of a new method and multifunctional composition for treating soil to obtain improved control over soil dwelling plant pathogens, such as nematodes, and also herbicidal activity on undesired plant species.

It has now been found that certain diphenylalkylamines exhibit the properties of a selective plant protectant against nematodes and are preferentially herbicidal toward monocotyledon plant seeds.

More specifically, this invention relates to chemical compounds of the general formula:

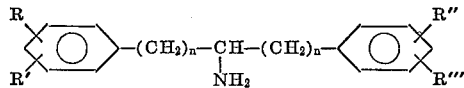

wherein R, R', R" and R'" represent hydrogen, lower alkyl or lower alkoxy up to three carbon atoms, halo or nitro; and $n$ is an integer from one to three.

Preferred compounds are those where both $n$'s are one, and the R's are positioned ortho and para.

Advantageous and preferred are those where at least two of the R's are hydrogen and both $n$'s are one.

The methods of synthesis of the aforedescribed diphenylalkylamines are generally known and do not form a part of the invention of the present disclosure. Numerous references in the literature teach practical means for their synthesis, i.e. U.S. Patent No. 1,921,424 to Nabenhauer. In any event, chemists skilled in the art of organic amine syntheses can readily provide large scale methods of the active compounds of this invention.

It will be understood that the salts of diphenyl lower alkyl amines may be readily prepared from the free compound by addition to the compound of desired acid radical which, in the case of the sulfate, for example, may be accomplished by suspending the amine in warm water, and neutralizing with sulfuric acid. The solid amine sulfate will crystallize out on concentration and cooling. The hydrochloride, acetate, and the like, may be similarly prepared by neutralizing with acetic acid, hydrochloric acid, or the like.

Exemplary of the multifunctional compounds useful according to the teaching of this invention are the following: 1,3-diphenylisopropylamine; 1,3-diphenylisobutylamine; 1,3-diphenylisoamylamine; 1,3-diphenylisohexylamine; 1,3-diphenylisoheptylamine; 1,3-di(o-nitrophenyl)-isopropylamine; 1,3 - di(2,4 - dichlorophenyl)isopropylamine; 1,3 - di(o - methylphenyl)isopropylamine; 1,3-di(p-methoxyphenyl)-isopropylamine.

Selectivity as to the possible optical isomers, or to the degree of ring substitution is not deemed critical to insure the level of pesticidal activity demonstrated by a reaction mixture comprising a major part of diphenylalkylamines.

Multifunctional compositions embodying the invention can be prepared in the form of solids or liquids. Solid compositions, preferably in the form of wettable powders, are compounded to give homogeneous free-flowing powder by mixing the active ingredient with finely-divided solids, clays, diatomaceous earth, synthetic fine silica or flours derived from walnut shell, redwood, soybean, cotton seed flour, or other solid conditioning agents or carriers of the kind conventionally employed in preparing pest control compositions in solid form.

Even more preferable among solid compositions, in some instances, are granules or pellets when the application is primarily to the soil. Granules may be prepared by impregnating granular diluents such as granular Attaclay, or may be made by first extending powdered solid with powdered diluent and subsequently granulating. Pellets are made by extruding moistened, powdered mixtures under high pressure through dies.

Pesticidal spray compositions of the invention can be prepared by mixing the active ingredient with a suitable liquid diluent medium using a high or low boiling solvent, such as acetone, aromatics, and DMSO. The resulting composition is then in the form of either a solution or suspension of the active ingredient.

The nematocidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays, whereby they can be applied as dispersing liquid sprays or gas-propelled sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955), including for example, the material known as Triton X-155 (100% alkylaryl polyether alcohol—U.S. Patent No. 2,504,064).

Generally, the surface-active agent will not comprise more than about 1% to 10% by weight of the composition depending, of course, upon the particular surface-active agent, the system in which it is placed, and the result desired; in certain compositions, the percentage will be 1% or less. Usually, the minimum lower concentration will be 0.1%.

The active compound is, of course, applied in an amount sufficient to exert the desired nematocidal or herbicidal action. The amount of the active ingredient present in the compositions as actually applied for killing nematodes and controlling fungi will vary with the manner of application, the particular nematodes or fungi for which control is sought, the purposes for which the application is being made, and like variables. In general, however, the biologically active formulation will contain from 5 p.p.m. to 50,000 p.p.m. of the active ingredient. Concentrations as low as 1 p.p.m. can be effectively employed. For some requirements stronger concentrations may be desirable up to a maximum of 500,000 p.p.m. In field application, rates of ½ pound to three-hundred-fifty pounds per acre of active ingredient (on an overall coverage basis) are suitable, with rates in the 20 to 80 pound range as a nematocide being preferred, and 0.5 to 20 pounds as a fungicide per 100 gallons of aqueous diluent also preferred. The optimum rate will depend on soil type, pathogen, and host species, and degree of control required. If seed treatment, row treatment, or spot treatment is used, the actual per-acre rates will be lowered, since the entire area is not permeated by the chemical but only the vicinity of the seedlings.

Various modifications and alterations of this invention will become apparent to those skilled in the art without departing from the scope and spirit of the invention, and it should be understood that the latter is not necessarily limited to the aforementioned disclosure.

NEMATOCIDE TEST PROCEDURES

Example 1

A dilution series is made with a 2.5% stock solution of the test chemical, 1,3-diphenylisopropylamine (SK&F 24) as follows:

(1) 0.5 ml. of stock+9.5 ml. of disilled water=10 ml. of 0.125%.

(2) 1 ml. of 1+9.0 ml. of distilled water=10 ml. of 0.0125%.

(3) 1 ml. of 2+9.0 ml. of distilled water=10 ml. of 0.00125%.

(4) 1 ml. of 3+9.0 ml. of distilled water=10 ml. of 0.000125%.

0.2 ml. of nematode suspension (containing 500–750 nematodes per ml.) is added to each of these dilutions to bring the final concentrations to 0.1, 0.01, 0.001 and 0.0001 percent respectively.

The initial test organism used was a species of Panagrellus, a free living nematode, nourished on oatmeal soaked in water.

The laboratory standard nematocide used was hexyl resorcinol, which gives a 100% kill at 0.01 percent.

A control (a pure nematode culture), and an untreated solvent check (solvent only added to nematode culture), were included in each test run.

Initial screening was conducted at 0.1 and 0.01% concentration. If some toxicity close to that of standard hexyl resorcinol was observed at these concentrations, the testing was repeated at 0.1, 0.01, also at 0.001 and 0.0001% concentrations. However, if toxicity were low, the testing would be again repeated at 0.1 and 0.01%. Results of the two runs are reported in Table I below.

TABLE I.—EFFECTIVENESS OF 1,3-DIPHENYL ISOPROPYLAMINE, SK&F 24, FOR CONTROL OF THE NEMATODE PANAGRELLUS

| Test Chemical | Conc., percent | Panagrellus (Plate test), percent mortality at 24 hours | |
|---|---|---|---|
| | | Run Number | |
| | | 1 | 2 |
| SK&F 24 | .1 | 100 | 100 |
| | .01 | 100 | 90 |
| | .001 | | 90 |
| | .0001 | | 50 |
| Hexylresorcinol (Standard) | .1 | 100 | 100 |
| | .01 | 100 | 100 |
| | .001 | | 75 |
| | .0001 | | 50 |
| Acetone and Nematode culture (Solvent check). | 6 | 10 | 0 |
| | 6 | 10 | 0 |
| Water and Nematode culture (Control) | | 10 | 10 |

HERBICIDAL TEST PROCEDURE I

Example 2

1,3-diphenylisopropylamine, SK&F No. 24, was evaluated for selective herbicidal activity in a pre-emergent seed germination test procedure described below.

One gram of test chemical is dissolved in 20 ml. of acetone. To this 80 ml. of distilled water is added. At this concentration of acetone no undesirable effects were noticed on either germination or growth. This gives a solution containing 1 gm. of test chemical/95.8 gms. of acetone plus water (w./w.), or 10,436 p.p.m. (≅10,450 p.p.m.), or 1 gm. of test chemical/100 ml. of solvent (w./v.), or a 1% stock solution. The stock solution is further diluted with distilled water to give the following concentrations of test chemical: 0.5% or 5225 p.p.m.; 0.25% or 2612.5 p.p.m.; 0.125% or 1306.25 p.p.m.

Adsorbent paper is cut to fit the bottom of the petri dishes and moistened with 5 ml. of distilled water. Ten seeds are placed in each dish and 2 ml. of each test chemical are pipetted over the seeds. Petri dishes containing the water control and the standards are similarly prepared. After rolling each petri dish for distribution of test chemical, the petri dishes are covered and placed in the Mangelsdorf germinator set at 78° F.

Results of two and three replicates of SK&F 24 and comparisons to four standard herbicides, plus a control, are shown in tabular form in Table II.

0.1% Triton X-100 until run-off. The plants used are in the late three, or early four, leaf stages and range around

TABLE II.—SEED GERMINATION

| Compound | Conc., percent w./v. | Number of days of incubation prior to count | | Wheat var. Contender (a monocotyledon) | | | | | | Beans var. Valentine (a dicotyledon) | | | | Remarks—Symptoms |
|---|---|---|---|---|---|---|---|---|---|---|---|---|---|---|
| | | 4-5 Wheat | 6-7 Beans | Percent Germination* | Growth Response | | | | | Percent Germination* | Growth Response | | | |
| | | | | | JG | MG | $S_1$ | $S_2$ | $S_3$ | | JG | MG | $S_{1B}$ | |
| HCH Control (1) | | | | 94 | 0 | 80 | 0 | 0 | 14 | 93 | 2 | 76 | 15 | |
| HCH Control (2) | | | | 94 | 0 | 94 | 0 | 0 | 0 | 77 | 0 | 34 | 43 | (Wheat |
| 2-4-5 T 2-4-5 Trichlorophenoxyacetic acid | 0.125 | | | 30 | 7 | 0 | 0 | 20 | 3 | 63 | 63 | 0 | 0 | Growth curled |
| | 0.25 | | | 7 | 0 | 0 | 7 | 0 | 0 | 60 | 20 | 0 | 40 | and twisted. |
| | 0.5 | | | 0 | 0 | 0 | 0 | 0 | 0 | 45 | 10 | 0 | 35 | |
| | 1.0 | | | 0 | 0 | 0 | 0 | 0 | 0 | 45 | 13 | 0 | 32 | |
| 2-4 D 2-4 Dichlorophenoxyacetic acid | 0.125 | | | 60 | 0 | 0 | 30 | 30 | 0 | 65 | 28 | 0 | 37 | |
| | 0.25 | | | 48 | 0 | 0 | 25 | 23 | 0 | 45 | 18 | 0 | 27 | Twisted and dead. |
| | 0.5 | | | 35 | 0 | 0 | 17 | 18 | 0 | 0 | 0 | 0 | 0 | |
| | 1.0 | | | 5 | 2 | 0 | 3 | 0 | 0 | 0 | 0 | 0 | 0 | All dead after germi. |
| Dalapen 2,2-dichloropropionic acid sodium salt. | .15 | | | 90 | 0 | 60 | 0 | 0 | 30 | 90 | 0 | 90 | 0 | |
| | .30 | | | 75 | 0 | 10 | 0 | 0 | 65 | 80 | 0 | 78 | 2 | |
| | .60 | | | 50 | 20 | 5 | 25 | 0 | 0 | 73 | 7 | 57 | 9 | |
| | 1.25 | | | 35 | 10 | 0 | 15 | 10 | 0 | 73 | 27 | 3 | 43 | |
| Telvar (Monuron) 3,(4-chlorophenyl)-1,1 dimethylurea. | .15 | | | 63 | 2 | 23 | 10 | 28 | 0 | 53 | 5 | 48 | 0 | |
| | .30 | | | 80 | 0 | 40 | 0 | 40 | 0 | 58 | 18 | 40 | 0 | |
| | .60 | | | 60 | 0 | 23 | 0 | 37 | 0 | 65 | 18 | 47 | 0 | |
| | 1.25 | | | 63 | 8 | 30 | 0 | 25 | 0 | 55 | 8 | 47 | 0 | |
| SK&F 24 | 0.125 | 5 | 6 | 70 | | | 70 | | | 100 | 10 | 90 | | |
| | 0.25 | 5 | 6 | 80 | | | 80 | | | 100 | | 100 | | |
| | 0.5 | 5 | 6 | 0 | | | | | | 100 | | 100 | | |
| | 1.0 | 5 | 6 | 0,0 | | | | | | 80,70 | 60,50 | | 20,20 | |
| | 2 repl. | 5 | 6 | 0 | | | | | | 90 | | | 90 | |

*Average of 4 replicates.
JG=just germinating—appearance of root rudiment; MG=maximum growth; $S_1$—wheat=2 to 3 rootlets, ¼-½" long; $S_2$—wheat=rootlets ½-1" long, shoot ¼-½" long; $S_3$—wheat=rootlets 1-2" long, shoot ½-1" long; $S_{1B}$—beans=root ½-1" long.

The data of Table II clearly indicates that as to inhibiting seed germination, SK&F No. 24 is selectively herbicidal to monocotyledons, such as wheat, and only slightly phytotoxic to dicotyledonous seed, such as those of beans.

HERBICIDAL TEST PROCEDURE II

Example 3

1,3-diphenylisopropylamine, SK&F No. 24, was then further evaluated for herbicidal activity in a post-emergent screen test procedure described below:

An annual dicotyledon, such as the tomato plant, is dipped in a solution of the candidate herbicide containing three or four inches in height. Five potted specimens of individual tomato plants at each test chemical concentration are employed. One replicated test is conducted, for a total of five plants at each concentration.

Also, a typical annual monocotyledon, such as barley, is dipped in a solution of the candidate herbicide containing 0.1% Triton X-100 until run-off. The plants used are seven days old. The plants are grown in Dixie cups, five plants to a cup, for each chemical and at each concentration. A single replicated test is conducted for a total of ten plants for each chemical at each concentration.

Results of runs with SK&F No. 24 compared to four standards, plus a control, are shown in Table III.

TABLE III.—POST EMERGENT SCREENS

| Test plant | Tomato (Annual dicotyledon) | | | | | | | | | | | | | | | | | | | | | | | |
|---|---|---|---|---|---|---|---|---|---|---|---|---|---|---|---|---|---|---|---|---|---|---|---|---|
| Concentration | 0.1% | | | | | | | | | | | | 1.0% | | | | | | | | | | | | |
| Days | 1-2 | | | | | 5 | | | | | 10-14 | | | | | 1-2 | | | | | 5 | | | | 10-14 |
| Rating | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
| Control A (HCH) | 10 | | | | | 10 | | | | | 10 | | | | | 10 | | | | | | | | | |
| 2,4 D 2,4 dichlorophenoxyacetic acid | | | | | | 5 | 3 | 2 | | | 7 | 3 | | | | 1 | 9 | | | | 10 | | | | |
| 2,4,5 T 2,4,5 trichlorophenoxyacetic acid | | | | | | 5 | 5 | | | | 2 | 8 | | | | | | | | | 10 | | | | |
| Dalapon 2,2 dichloropropionic acid sodium salt | | | | | | 10 | | | | | 9 | 1 | | | | | | | | | 10 | | | | |
| Telvar (Monuron) 3,(4-chlorophenyl) 1,1 dimethyl urea | | | | | | 10 | | | | | | | | | | 10 | | | | | | | | | |
| Simazine 2, chloro-4,6-bis (ethylamine) 1,3,5 triazine | | | | | | | | | | | | | | | | | | | | | | | | | |
| 24 | | | | | | 5 | | | | | 5 | | | | | 5 | | | | | 5 | | | | |

TABLE III.—POST EMERGENT SCREENS—Continued

| Test plant | Barley (Annual monocotyledon) | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| Concentration | 0.1% | | | | | | | | | | | | | | | 1.0% | | | | | | | | | | | | | | |
| Days | 1-2 | | | | | 5 | | | | | 10-14 | | | | | 1-2 | | | | | 5 | | | | | 10-14 | | | | |
| Rating | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
| Control A (HCH) | 10 | | | | | 10 | | | | | 10 | | | | | 10 | | | | | | | | | | | | | | |
| 2,4 D 2,4 dichlorophenoxyacetic acid | 3 | | 7 | | | | | | | 10 | | | | | 10 | | | | | 10 | | | | | 10 | | | | | |
| 2,4,5 T 2,4,5 trichlorophenoxyacetic acid | 2 | 7 | 1 | | | 7 | 3 | | | | | 1 | 8 | 1 | | 1 | 3 | 4 | 2 | | 2 | 2 | 5 | 1 | | | 1 | 7 | 2 | |
| Dalapon 2,2 dichloropropionic acid sodium salt | 2 | 8 | | | | 5 | 5 | | | | | | | | 10 | | | | | 10 | | | | | 10 | | | | | |
| Telvar (Monuron) 3, (4-chlorophenyl) 1,1 dimethyl urea | 2 | 4 | 3 | 1 | | 2 | 7 | 1 | | | 1 | 3 | 2 | 4 | | 3 | 1 | 5 | 1 | | | 3 | 5 | 2 | | | | 2 | 8 | |
| Simazine 2, chloro-4,6-bis (ethylamine) 1,3,5 triazine | 2 | 5 | 3 | | | 2 | 4 | 4 | | | 2 | 8 | | | | 2 | 3 | 5 | | | 2 | | 6 | 2 | | | 4 | 3 | 4 | |
| 24 | 10 | | | | | 10 | | | | | 10 | | | | | 10 | | | | | 10 | | | | | 10 | | | | |

Ratio: 0=Normal (no injury); 1=Slight injury; 2=Moderate injury; 3=Severe injury; 4=Dead.

Criteria, such as, abscission, chlorosis, contact, curvature, formative, galling, killing, necrosis, abnormal pigment, quilling, adventitious roots and stunting, are used in rating.

The data of Table III surprisingly indicates that in post-emergent screens, SK&F No. 24 is now herbicidal to dicotyledons, such as tomato plants, and non-phytotoxic to monocotyledons, such as barley plants, a unique versatility of action.

Various modifications and alternations of this invention will become apparent to those skilled in the art without departing from the scope and spirit of the invention, and it should be understood that the latter is not necessarily limited to the aforementioned disclosure.

What is claimed is:

1. A method for controlling nematodes in nematode infested soil parasitic nematodes which comprises applying to the nematode an effective amount of a diphenylalkylamine of the formula:

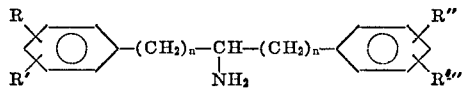

wherein:

R, R', R" and R'" are selected from the group consisting of hydrogen, halo, nitro, lower alkyl and lower alkoxy; and $n$ is an integer from one to three.

2. The method of claim 1 wherein said amine is 1,3-diphenylisopropylamine.

3. The method of claim 1 wherein from 0.5 to 350 pounds per acre of said amine is applied.

4. The method of claim 1 wherein the active ingredient is employed in the form of an aerosol containing a solvent and a gaseous propellant.

5. The method of claim 1 wherein the active ingredient is employed in the form of a mixable oil containing an inert solvent and an emulsifier.

6. The method of claim 1 wherein the active ingredient is employed in the form of a sprayable powder containing an inert solid carrier.

7. The method according to claim 1 wherein both of the $n$'s are one, and the R's are positioned at one of the ortho and para positions relative to the bond with the alkyl chain.

References Cited

Chemical Abstracts (II), volumes 41—50, Fifth Decennial Index, Subjects Od-Pn, Dec. 7, 1961, page 9387(s).
Chemical Abstracts 59, 13853h (1963).

ALBERT T. MEYERS, Primary Examiner

J. D. GOLDBERG, Assistant Examiner